US 6,536,807 B1

(12) United States Patent
Raymond et al.

(10) Patent No.: US 6,536,807 B1
(45) Date of Patent: Mar. 25, 2003

(54) DETACHABLE FAST-COUPLING HAVING AN AUTOMATIC ASSEMBLY INDICATOR

(75) Inventors: Albert Raymond, Seyssinet (FR); Erminio Moretti, Grenoble (FR); Daniel Martin-Cocher, Grenoble (FR); Hans-Jurgen Lesser, Rheinfelden (DE)

(73) Assignee: A. Raymond & CIE (FR)

( * ) Notice: Subject to any disclaimer, the term of this patent is extended or adjusted under 35 U.S.C. 154(b) by 0 days.

(21) Appl. No.: 09/700,969

(22) PCT Filed: May 3, 1999

(86) PCT No.: PCT/EP99/02984

§ 371 (c)(1),
(2), (4) Date: Nov. 20, 2000

(87) PCT Pub. No.: WO99/60300

PCT Pub. Date: Nov. 25, 1999

(30) Foreign Application Priority Data

May 20, 1998 (DE) .......................... 198 22 574

(51) Int. Cl.[7] ............................................. F16L 37/084
(52) U.S. Cl. .................... 285/93; 285/305; 285/308; 285/319; 285/322
(58) Field of Search ................. 285/305, 308, 285/319, 423, 921, 93, 322

(56) References Cited

U.S. PATENT DOCUMENTS

| 4,836,580 A | * | 6/1989 | Farrell | 285/24 |
| 4,913,467 A | * | 4/1990 | Washizu | 285/39 |
| 5,374,088 A | * | 12/1994 | Moretti et al. | 285/305 |
| 5,441,313 A | * | 8/1995 | Kalahasthy | 285/93 |
| 6,086,119 A | * | 7/2000 | Hänsel | 285/309 |
| 6,089,616 A | * | 7/2000 | Trede et al. | 285/93 |

FOREIGN PATENT DOCUMENTS

| EP | WO9748936 | * 12/1997 |

* cited by examiner

*Primary Examiner*—Lynne H. Browne
*Assistant Examiner*—Giovanna Collins
(74) *Attorney, Agent, or Firm*—Gifford, Krass, Groh, Sprinkle, Anderson & Citkowski, P.C.

(57) ABSTRACT

A detachable coupling includes a housing having wall, an end that has an inner wall, and a receiving space that has an opening in the end. The opening and the receiving space receives a tubular insertion part that has a retaining rib. An indicating part is removably mounted to the end of the receiving housing and includes a support ring and a lever. The lever has a free end and a inner end and is pivotally mounted to the support ring and extends into the receiving space. A support projection is positioned on the inner end of the lever and contacts the inner wall. Insertion of the tubular insertion part causes the retaining rib to contact the free end of the lever and results in the pivoting of the lever. Pivoting of the lever disengages the support projection from the inner wall and dismounts the indicating part from the housing.

7 Claims, 2 Drawing Sheets

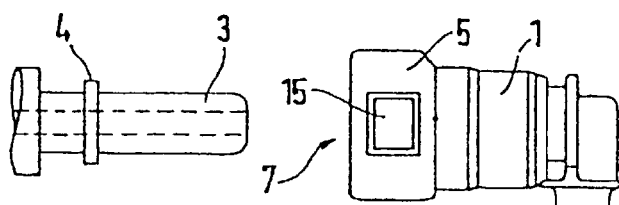
FIG. 1
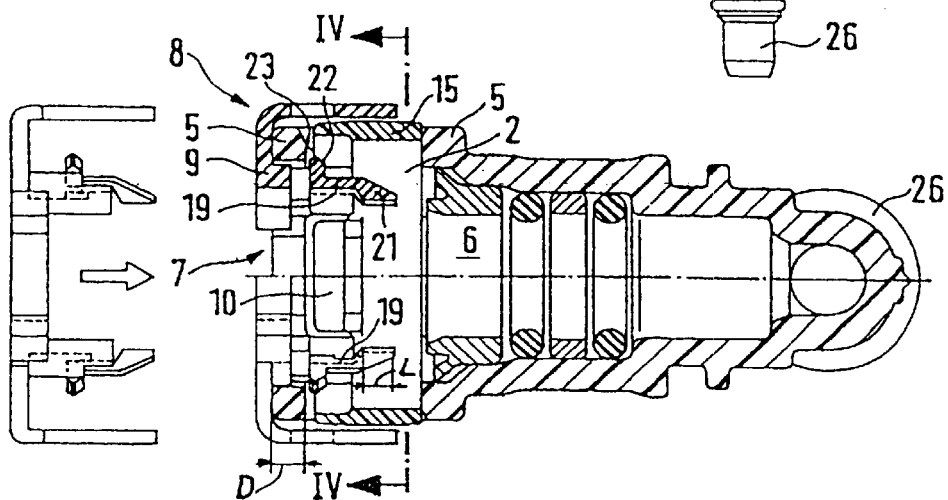
FIG. 2
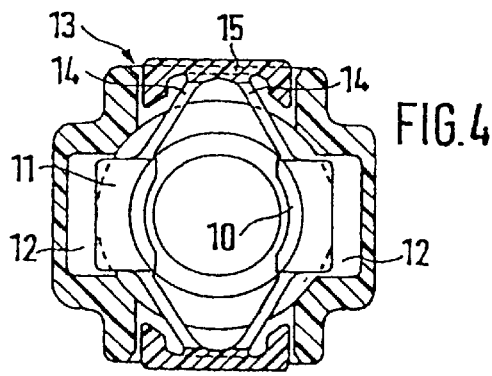
FIG. 4
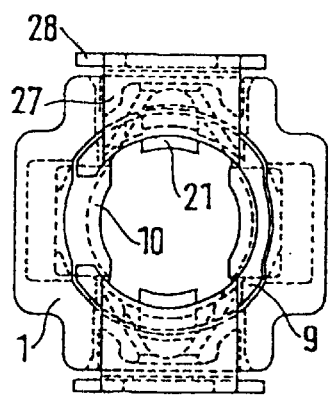
FIG. 3
FIG. 7
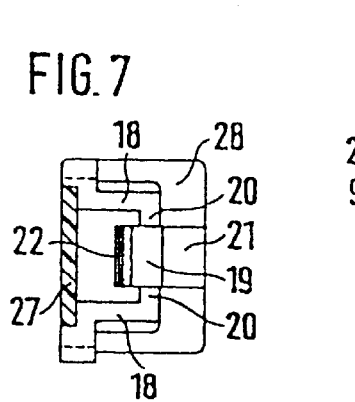
FIG. 5
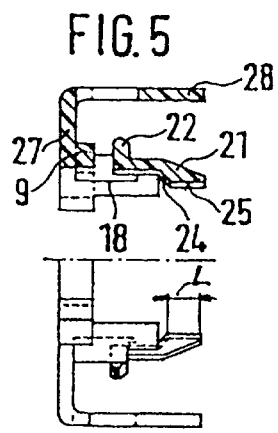
FIG. 6
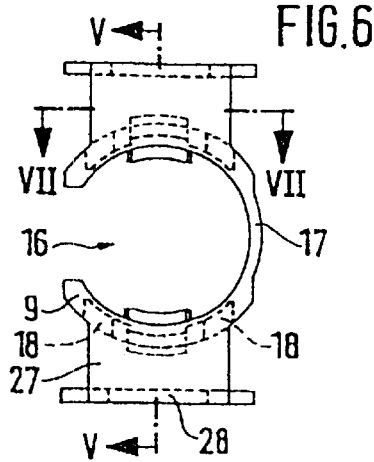

DETACHABLE FAST-COUPLING HAVING AN AUTOMATIC ASSEMBLY INDICATOR

BACKGROUND

1. Field of the Invention

The present invention relates to a detachable fast-coupling with an automatic assembly indicator for connecting fluid lines.

2. Reference to Related Art

Fast-couplings are used, for example, in the motor vehicle industry in order to connect fluid lines to each other or to insertion parts molded or otherwise attached to fuel containers or fuel distributors. Typically, there is not only a simple and easy assembly as well as an absolutely sealed connection after the insertion part is secured in the coupling housing, but the coupling must also, when necessary, be easily detachable.

The present invention is based on a fast-coupling with an assembly indicator known from EP 0 547 489 A1. The indicator part shown there consists of a ring which can be positioned in front of the insertion opening the receiving housing and which supports itself on the latter's facing wall, as well as of at least two retaining members facing each other and projecting into the receiving space. At the free ends of the retaining members a peripheral stop ring is formed which interacts with the retaining rib during introduction of the insertion part in such a way that the stop ring is pushed inwards by the retaining rib, at which time the support ring tears away from predetermined breaking points starting at the retaining members. The fact that the support ring now hangs loosely in front of the entrance of the housing serves as proof that the coupling parts are securely connected to each other. The disadvantages of this assembly indicator include the fact that the indicating part with its retaining members and stop ring is inserted with play into the receiving space, furthermore, for the purpose of tearing at the predetermined breaking points, a considerable amount of strength is required.

SUMMARY OF THE PRESENT INVENTION

It is the task of the invention to construct the assembly indicator in such a way that the indicator part, after being introduced into the receiving space, is held securely and without movement and that the detachment of the indicator part is achieved easily and without special exertion of strength without compromising the secured state of the locking element upon the introduction of the insertion part.

Furthermore, the invention concerns itself with constructing the indicating part in such a way that it can be retrofitted without special preparations for the fast-coupling known from EP 0 605 801 C1. With this coupling, the retaining element mounted diagonally with respect to the housing axis is provided with retaining edges that are connected at their ends by means of V-shaped spring pins to pressure plates which extend all the way to the outside through appropriate openings in the housing wall and can be pressed in from the outside for the purpose of detaching the coupling.

BRIEF DESCRIPTION OF THE DRAWINGS

The characteristics necessary for the refinement of the invention and their advantages can be gathered from the subsequent description and drawings. An embodiment of the invention is shown in the drawings and shall be explained in greater detail in the following. Shown are:

FIG. 1, the receiving housing of a fast-coupling with insertion part before it is inserted;

FIG. 2, the coupling housing in longitudinal cross section with assembly indicator before and after the indicating part has been inserted;

FIG. 3, the inlet area of the housing with the indicating part in front view;

FIG. 4, a cross section through the front area of the receiving space with retaining element in accordance with line IV—IV in FIG. 2;

FIG. 5, a side view of the indicating part with a partial cross section in accordance with line V—V in FIG. 6;

FIG. 6, the indicating part in front view;

FIG. 7, a cross section through the indicating part in accordance with line VII—VII in FIG. 6;

DETAILED DESCRIPTION OF A PREFERRED EMBODIMENT

Figure 8:
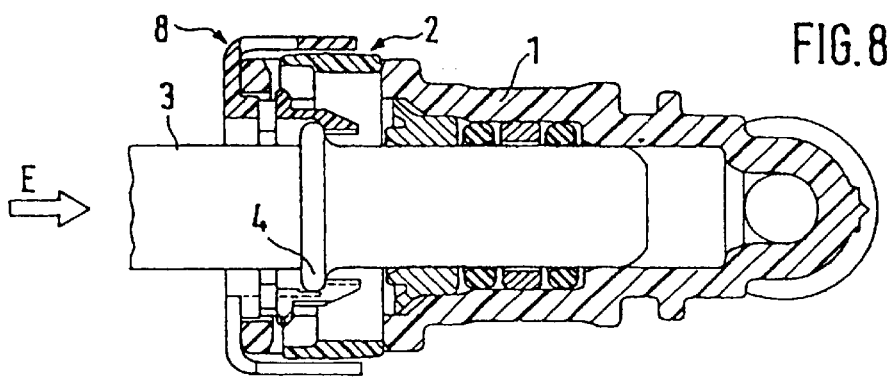
FIG. 8, the insertion housing with a locked indicating part during the introduction of the insertion part.

The fast-coupling shown in the figures, as can be seen in FIG. 1, includes a receiving housing (1) made of a synthetic material with a tubular connecting piece (26) for the purpose of connecting a fluid line, not shown, and of a cylindrical receiving space (6) for the introduction of a tubular insertion part (3) with a peripheral retaining rib (4).

The insertion part (3) may be the end of a sturdy metal pipe used, for example, for fuel lines. However, it may also—exactly like the receiving housing—be formed from a rigid synthetic material or another injection molded material, which can be connected to a fluid line in the same manner as the connecting piece (26) of the receiving housing. Alternatively, it may be molded or otherwise fastened to a fuel container or fuel distributor.

In the front area of the receiving space (6), there is a retaining element (2) made of a hard elastic synthetic material which can be introduced into the receiving space (6) through an opening in the cylindrical housing wall (5). This retaining element (2) has two circular retaining edges (10) which are directed inwards and which grip behind the retaining rib (4) in a known manner after the insertion part (3) has been inserted, thus coupling the insertion part (3) inside the housing (1).

For this purpose, the retaining edges (10) are molded onto two outwardly protruding support elements (11) which each extend in the installed state of the retaining element (2) into corresponding recesses (12) of the housing wall (5) and are retained there against the direction of insertion. The support elements (11) are connected to each other at their ends by means of V-shaped spring pins (14) where each of the connection points is covered with an approximately rectangular pressure plate (15) protruding through the housing opening (13) toward the outside.

For the detachment of the coupling, the pressure plates (15) are pressed together from the outside. The retaining edges (10) are moved apart via the spring pins (14) and the support element (11) so that the retaining rib (4) is exposed and the insertion part (3) can be pulled out of the insertion housing (1).

Figure 11:
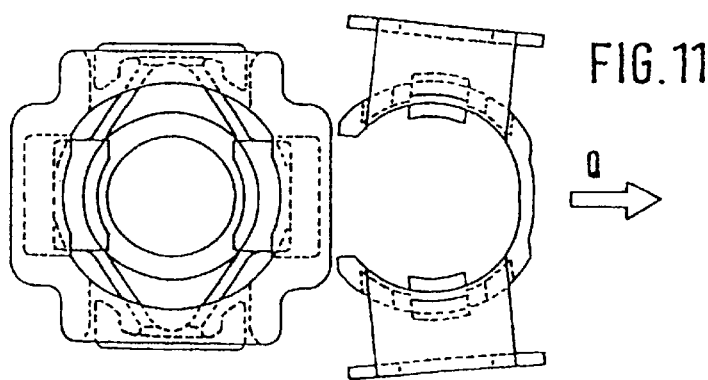

The indicating part (8), shown separately in FIGS. 5–7, is also produced from a hard elastic synthetic material and includes a support ring (9) which has on one side a gap (16) and on the opposite side a reduced cross section (17) that allows the ring (9) to be bent apart more easily after the indicating part (8) has been withdrawn from the receiving space (6) so as to allow the indicating part (8) to be pulled away laterally (FIG. 11).

Two opposing retaining members (18) which can be introduced into the receiving space (6) within the free space between the spring pins (14) of the retaining element (2) are molded to the support ring (9) parallel to the axis. Between two retaining members (18) there are two opposing levers (19) which are integrated by means of short connection elements (20) to the ends of the retaining members (18) and which, due to the torsional behavior of the connection elements, are mounted so that they can pivot parallel to the axis of the housing.

The lever (19) has a free end and an inner end. The free end has a inwardly protruding stop projection (21) which extends in the direction of insertion and at the inner end pointing towards the support ring (9) there are externally angled support projections (22) which support themselves against the inner facing wall (23) of the receiving space (6) in the axial direction when the indicating part (8) is installed (FIG. 2).

Figure 9:
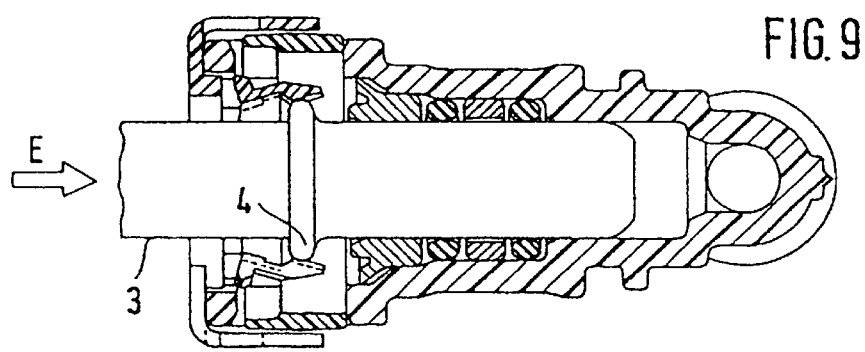
FIG. 9, the insertion housing with the coupled insertion part and unlocked indicating part.

The stop projections (21) have stop surfaces (24) which, in the direction of insertion of the retaining rib (4), are tapered in such a way that the stop projections (21) are pressed outwards by its retaining rib (4) during the introduction of the insertion part (3) in the direction of the arrows (E) (FIGS. 8–9).

This process of pressing apart is completed as soon as the retaining rib (4) has traversed the retaining edges (10) of the retaining element (2) which is also moving outwards and the retaining edges (10) are locked behind the retaining rib (4) (FIG. 9). At this moment, the retaining rib (4) contacts the internal gliding surfaces (25) of the stop projections (21), which in the uncharged state extend parallel to the axis and have a length (L) which corresponds to the thickness (D) of the facing wall (23) at the opening of the housing.

For the acceptable functioning of the assembly indicator, it is important that the stop projections (21) with their gliding surfaces (25) extend inwards and the support projections (22) protrude outwards only to such an extent that while the stop projections (21) are being pressed apart, the support projections (22) are pressed inwards with a distance sufficient for passing through the insertion opening (7).

Figure 10:
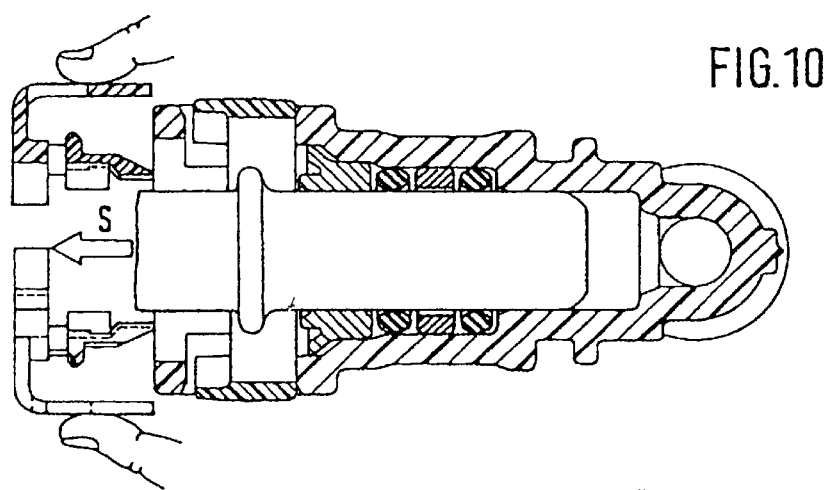
FIG. 10, the insertion housing with the coupled insertion part and protruding indicating part as proof of a correct assembly and FIG. 11, the opening of the housing in front view with a laterally pulled away indicating part.

Due to the sudden release of the support projection (22) from the inner facing wall (23) and the contact of the retaining rib (4) on the gliding surface (25) which is now inclined in the outward direction, there is a spring effect. The indicating part (8) is withdrawn from the receiving space (6) in the direction of the arrow S (FIG. 10) and then can be pulled away laterally in the direction of the arrow (Q), as shown in FIG. 11.

Across the total width of the retaining members (18), two radial support members (27) pointing outward are molded to the support ring (9) with ends having cover flaps (28) angled parallel to the pressure plates (15). These serve to make it easier to grasp the indicating part (8) during the introduction of the retaining members (18) into the insertion opening (7) and also during the lateral detachment after removal from the insertion opening according to FIG. 11. Furthermore, the support members (27) make it easier to find the correct position during insertion, wherein the cover flaps (28) merely need to be slid across the pressure plates. The support members (27) are located here at the edge of the support ring (9) in the direction of insertion in front of the indicating part (8), so that the rear, inner edge extends in a centering manner into the insertion opening (7). In this way, the indicating part (8), in connection with the support projections (22) secured at the facing wall (23), and the cover flaps (28) resting on the pressure plates (15) are retained very securely in the insertion opening (7) so that the pre-mounted indicating parts (8) are not lost during transport before use.

What is claimed is:

1. A detachable fast-coupling comprising:
    a housing having a housing wall, an end and defining a receiving space, said end of said housing including an inner housing wall and defining an opening to said receiving space of said housing, said opening of said end and said receiving space of said housing being adapted to receive a tubular insertion part, said tubular insertion part having a retaining rib;
    a retaining element positioned within said receiving space of said housing, said retaining element having a retainer member; and
    an indicating part removably mounted to said end of said housing, said indicating part having a support ring and a lever pivotably mounted to said support ring, said lever of said indicating part having a free end and an inner end and extending into said receiving space of said housing when said indicating part is mounted to said end of said housing, said inner end of said lever having a support projection adapted to releasably engage said inner housing wall of said end of said housing, said retaining rib of said tubular insertion part being adapted to contact said free end of said lever to cause said lever to pivot and release said support projection of said inner end of said lever from engagement with said inner housing wall of said end of said housing to thereby dismount said indicating part from said end of said housing.

2. The detachable fast-coupling of claim 1, wherein said free end of said lever further comprises a stop projection.

3. The detachable fast-coupling of claim 2, wherein said stop projection of said lever further comprises a stop surface and an internal gliding surface.

4. The detachable fast-coupling of claim 3, wherein said stop surface is tapered in a direction of insertion of said tubular insertion part.

5. The detachable fast-coupling of claim 3, wherein said internal gliding surface extends parallel to an axis of said housing.

6. The detachable fast-coupling of claim 1, wherein said support ring further comprises a pair of circumferentially opposed arms, said arms defining a gap and having on a side opposite said gap a reduced cross section.

7. A detachable fast-coupling of the type having a housing including a housing wall, an end and defining a receiving space, said end of said housing having an inner housing wall and defining an opening to said receiving space, said opening and said receiving space being adapted to receive a tubular insertion part, said tubular insertion part having a retaining rib, said fast coupling also having a retaining element positioned within said receiving space of said housing, said retaining element having a retainer member, the improvement comprising:
    an indicating part removably mounted to said end of said housing, said indicating part including a support ring and a lever pivotably mounted to said support ring, said lever having an inner end and a free end and extending into said receiving space of said housing when said indicating part is mounted to said end of said housing, said inner end of said lever including a support projection adapted to releasably engage said inner housing wall of said end of said housing;

whereby upon insertion of said tubular insertion part said retaining rib contacts said free end of said lever to cause said lever to pivot and release said support projection from engagement with said inner housing wall to thereby dismount said indicating part from said end of said housing.

\* \* \* \* \*